United States Patent
Oglesbee et al.

(10) Patent No.: US 11,906,174 B2
(45) Date of Patent: Feb. 20, 2024

(54) LOAD BASED HOT WATER TEMPERATURE CONTROL

(71) Applicant: Rheem Manufacturing Company, Atlanta, GA (US)

(72) Inventors: Robert Aaron Oglesbee, Fishers, IN (US); Matthew S. Wasson, Fishers, IN (US)

(73) Assignee: Rheem Manufacturing Company, Atlanta, GA (US)

(*) Notice: Subject to any disclaimer, the term of this patent is extended or adjusted under 35 U.S.C. 154(b) by 589 days.

(21) Appl. No.: 16/697,012

(22) Filed: Nov. 26, 2019

(65) Prior Publication Data

US 2021/0157346 A1  May 27, 2021

(51) Int. Cl.
*F24D 19/10* (2006.01)
*F24D 17/00* (2022.01)
(Continued)

(52) U.S. Cl.
CPC ..... *F24D 19/1051* (2013.01); *F24D 17/0031* (2013.01); *F24H 9/2007* (2013.01); *F24H 15/174* (2022.01); *F24H 15/184* (2022.01); *F24H 15/20* (2022.01); *F24H 15/219* (2022.01); *F24H 15/242* (2022.01); *F24H 15/281* (2022.01); *F24H 15/315* (2022.01); *G05D 23/134* (2013.01); *G05D 23/1366* (2013.01); *F24D 2220/042* (2013.01);
(Continued)

(58) Field of Classification Search
CPC ............ G05D 23/134; G05D 23/1366; G05D 23/132; F24D 17/0031; F24D 19/1051; F24D 2220/042; F24D 2220/209; F24D 3/08; F24D 3/087; F24H 9/2007; F24H 9/2014; F24H 15/174; F24H 15/315; F24H 17/0031; G01F 1/667
USPC ........................................................ 122/13.3
See application file for complete search history.

(56) References Cited

U.S. PATENT DOCUMENTS 4,870,986 A * 10/1989 Barrett ............... G05D 23/1393
                                                              122/13.3
5,791,557 A     8/1998 Kunze
(Continued)

FOREIGN PATENT DOCUMENTS

CH         247395 A      3/1947
DE        1024700 B      2/1958
(Continued)

*Primary Examiner* — Steven S Anderson, II
(74) *Attorney, Agent, or Firm* — Eversheds Sutherland (US) LLP

(57) ABSTRACT

A hot water delivery system includes a water heater, a mixing valve that is coupled to the output of the water heater, and a plurality of loads that are coupled to the output of the mixing valve. A load set point temperature of each load that is representative of a maximum temperature of the hot water that is to be delivered to the respective load is set by a user. Responsive to detecting the occurrence of an event associated with a load of the plurality of loads, a controller of the water heater controls the mixing valve to adjust the temperature of the hot water from the water heater to the load set point temperature associated with the load, provided the load set point temperature of the load is different from a water heater set point temperature at which the water heater maintains the hot water therein.

21 Claims, 8 Drawing Sheets

(51) Int. Cl.
*F24H 9/20* (2022.01)
*G05D 23/13* (2006.01)
*F24H 15/242* (2022.01)
*F24H 15/281* (2022.01)
*F24H 15/174* (2022.01)
*F24H 15/184* (2022.01)
*F24H 15/315* (2022.01)
*F24H 15/219* (2022.01)
*F24H 15/20* (2022.01)
*F24H 15/421* (2022.01)
*F24H 15/238* (2022.01)
*F24H 15/464* (2022.01)
*F24H 15/395* (2022.01)

(52) U.S. Cl.
CPC ...... *F24D 2220/209* (2013.01); *F24H 15/238* (2022.01); *F24H 15/395* (2022.01); *F24H 15/421* (2022.01); *F24H 15/464* (2022.01)

(56) References Cited

U.S. PATENT DOCUMENTS

| | | | |
|---|---|---|---|
| 5,845,844 A * | 12/1998 | Zosimodis | E03C 1/057 236/12.12 |
| 6,676,024 B1 * | 1/2004 | McNerney | G05D 23/1393 236/12.12 |
| 6,861,621 B2 | 3/2005 | Ghent | |
| 6,913,203 B2 | 7/2005 | DeLangis | |
| 6,962,162 B2 * | 11/2005 | Acker | F24D 19/1051 137/357 |
| 7,458,520 B2 | 12/2008 | Belz et al. | |
| 7,744,007 B2 | 6/2010 | Beagen et al. | |
| 8,074,894 B2 | 12/2011 | Beagen | |
| 8,167,215 B2 | 5/2012 | Sansum et al. | |
| 8,176,937 B2 | 5/2012 | Zhang et al. | |
| 8,500,035 B2 | 8/2013 | Goncze | |
| 8,517,282 B2 | 8/2013 | Sansum et al. | |
| 9,122,284 B2 | 9/2015 | Ferguson | |
| 9,124,098 B2 | 9/2015 | Broniak et al. | |
| 9,244,466 B2 | 1/2016 | DuPlessis et al. | |
| 9,268,342 B2 | 2/2016 | Beyerle et al. | |
| 9,310,813 B2 | 4/2016 | Farris et al. | |
| 9,638,439 B2 | 5/2017 | Shaffer et al. | |
| 9,696,043 B2 | 7/2017 | Ward et al. | |
| 9,732,983 B2 * | 8/2017 | Zeller | F24D 19/1051 |
| 9,851,111 B1 * | 12/2017 | Lyons | G05D 23/1919 |
| 9,874,466 B2 * | 1/2018 | Leaders | G01F 1/66 |
| 9,885,497 B2 | 2/2018 | Ward et al. | |
| 9,970,681 B2 | 5/2018 | Ward et al. | |
| 10,082,301 B1 | 9/2018 | Shaffer | |
| 10,209,721 B2 | 2/2019 | Ward et al. | |
| 10,240,816 B2 * | 3/2019 | Whitehouse | F24H 1/186 |
| 10,274,104 B2 | 4/2019 | Farris et al. | |
| 10,316,981 B2 | 6/2019 | Ward et al. | |
| 10,481,622 B2 | 11/2019 | Eveleigh et al. | |
| 10,983,540 B2 | 4/2021 | Eveleigh et al. | |
| 11,293,668 B2 | 4/2022 | Shaffer et al. | |
| 11,326,809 B1 | 5/2022 | Tsai et al. | |
| 11,347,246 B2 | 5/2022 | Goodjohn et al. | |
| 2002/0043224 A1 | 4/2002 | Richter | |
| 2002/0066794 A1 | 6/2002 | Wolber et al. | |
| 2003/0080194 A1 * | 5/2003 | O'Hara | G05D 23/1393 236/12.12 |
| 2003/0089399 A1 * | 5/2003 | Acker | F24D 17/0078 137/337 |
| 2007/0005190 A1 * | 1/2007 | Feinleib | F24D 19/1051 700/275 |
| 2009/0139466 A1 * | 6/2009 | Takayama | F24D 19/1051 122/14.2 |
| 2009/0287355 A1 * | 11/2009 | Milder | F24F 3/06 700/282 |
| 2011/0147473 A1 * | 6/2011 | Hammerstrom | G05D 23/1917 236/51 |
| 2013/0327313 A1 * | 12/2013 | Arnold | F24H 9/2007 126/344 |
| 2014/0131462 A1 * | 5/2014 | Stevens | F24H 9/2007 237/8 A |
| 2014/0202549 A1 * | 7/2014 | Hazzard | F24H 9/2007 236/12.12 |
| 2014/0203093 A1 * | 7/2014 | Young | F24D 12/02 237/8 A |
| 2017/0122575 A1 * | 5/2017 | Acker | G05B 15/02 |
| 2017/0350102 A1 * | 12/2017 | Lee | E03C 1/055 |
| 2018/0024574 A1 * | 1/2018 | Goodjohn | G05D 23/1393 700/300 |
| 2018/0163993 A1 * | 6/2018 | Goodjohn | F24H 9/2007 |
| 2021/0318027 A1 | 10/2021 | Boros et al. | |
| 2021/0325919 A1 | 10/2021 | Hutchison et al. | |
| 2022/0180383 A1 | 6/2022 | Arrojula | |
| 2022/0235968 A1 | 7/2022 | Shaffer et al. | |

FOREIGN PATENT DOCUMENTS

| | | |
|---|---|---|
| DE | 1550252 A1 | 1/1970 |
| DE | 2703086 A1 | 7/1978 |
| EP | 0448315 A2 | 9/1991 |
| EP | 0767332 A2 | 4/1997 |
| EP | 1345103 A1 | 9/2003 |
| GB | 799232 A | 8/1958 |
| GB | 2112907 A | 7/1983 |
| GB | 2237619 A | 5/1991 |
| GB | 2329691 A | 3/1999 |
| WO | 9736219 A1 | 10/1997 |

* cited by examiner

LOAD BASED HOT WATER TEMPERATURE CONTROL

TECHNICAL FIELD

Embodiments of the present disclosure relate generally to hot water delivery systems, and more particularly to load based custom hot water temperature control in hot water delivery systems.

BACKGROUND

A hot water delivery system typically includes a water heater that is configured to heat water and maintain the hot water at a set temperature. The set temperature at which the hot water is maintained in the water heater may be referred to as a water heater set point temperature. Further, the hot water delivery system may include different loads that are coupled to the water heater via a hot water distribution line. The hot water delivery system may be configured to supply hot water from the water heater to the different loads via the hot water distribution line. The hot water distribution line may be commonly shared by the different loads, and the different loads may include any appropriate appliances that are configured to draw hot water from the water heater such as, but not limited to, faucets, a clothes washer, a dishwasher, a shower, etc.

In existing hot water delivery systems, the maximum temperature of the hot water that is delivered to all the loads that are coupled to the water heater may be equal to the water heater set point temperature. For example, if the water heater set point temperature is 130° F., then the temperature of the hot water that is delivered to each of the loads that are connected to the water heater may be 130° F. The existing hot water delivery systems do not allow each individual load that is coupled to the water heater to receive hot water having a maximum temperature that is different from that of another load or the water heater set point temperature. For example, the water heater set point temperature may be 140° F., which may not be ideal and safe for some loads such as a child's shower, for example. So, in said example, a user may desire to set the maximum temperature of the hot water that is delivered to the child's shower to a lower temperature, e.g., 110° F. to prevent scalding. But the existing hot water delivery systems do not allow a user to set the maximum temperature of the hot water that is delivered to the child's shower to a temperature that is different from the water heater set point temperature of the water heater.

Existing hot water delivery systems allow a user to change the water heater set point temperature of the water heater. However, adjusting the water heater set point temperature of the water heater adjusts the maximum temperature of the hot water delivered across all the loads that are coupled to the water heater without providing control over the maximum temperature of the hot water delivered to each individual load.

One solution to independently adjust the maximum temperature of the hot water that is delivered to each individual load that is coupled to a water heater may include mixing cold water with the hot water that is dispensed at the load to adjust the temperature of the hot water dispensed at the load to a temperature that is desired by the user. However, in said solution, the temperature of the hot water that reaches the load cannot be adjusted till it is dispensed at the point of use and then mixed with the cold water. That is, if the cold-water control valve or tap is turned off, the temperature of the hot water that is dispensed at the load will revert to the water heater set point temperature (e.g., 140° F.), which may not be ideal. For example, if a child turns on the hot water tap by mistake or if the hot water tap is turned on without turning on the cold water tap, the child could be scalded (e.g., if the water heater set point temperature is 140° F.) since the maximum temperature of the incoming hot water cannot be limited to a lower temperature before being dispensed at the point of use. Some shower heads that allow users to set a maximum temperature of the hot water prior to being dispensed at the point of use by using thermostatic mixing valves do exist. However, said shower heads may be very expensive. Also, such shower heads do not let users easily change and precisely control or adjust the maximum temperature of the hot water as desired by the user.

Another solution to independently adjust the maximum temperature of the hot water that is delivered to each individual load that is coupled to a water heater may include providing dedicated hot water distribution lines going to each load (washer, shower, sink, etc.). In said solution, mixers may also be provided on each line to control the maximum temperature of the hot water in each water line and to the load that is connected thereto. However, providing dedicated water lines for each load, and mixers for each dedicated line may be cost-intensive and inefficient.

In view of the above shortcomings of existing hot water delivery systems, there is a need for an improved hot water delivery system. This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a hot water delivery system. The hot water delivery system includes a load identification sensor installed in one of a hot water distribution pipe and a cold water distribution pipe of a water supply system. The hot water distribution pipe is configured to deliver hot water to a load and the cold water delivery pipe being configured to deliver cold water to the load. The hot water delivery system further includes a mixing valve. The mixing valve includes a first inlet that is coupled to an outlet of a water heater, a second inlet that is coupled to the cold water distribution pipe, and a valve outlet that is coupled to the hot water distribution pipe. A temperature sensor is coupled to the hot water distribution pipe at the valve outlet of the mixing valve. The hot water delivery system also includes a controller associated with the water heater. The controller is configured to determine, based on monitoring data received from the load identification sensor, that the load is switched on in association with a demand for the hot water. Responsive to determining that the load is switched on, the controller is configured to determine a first load set point temperature associated with the load. The first load set point temperature is representative of a maximum temperature of the hot water that is to be delivered to the load. The first load set point temperature is set by an end user. Also, responsive to determining the first load set point temperature, the controller is configured to control, based on a feedback from the temperature sensor, the mixing valve to adjust the maximum temperature of the hot water that is delivered from the water heater to the load from a water heater set point temperature at which the hot water is maintained in the water heater to the first load set point temperature by mixing the hot water from the water heater with the cold water from the cold water distribution pipe.

In another aspect, the present disclosure relates to a method of a controller of a water heater disposed in a hot water delivery system. The hot water delivery system includes a load identification sensor, a mixing valve coupled to an output of the water heater, a temperature sensor disposed at an output of the mixing valve, and a load that is coupled to the output of the mixing valve. The method includes receiving monitoring data from a load identification sensor that is configured to detect an event associated with the load. The event is associated with a demand for hot water. Further, the method includes determining an occurrence of the event associated with the load based on identifying a fingerprint associated with the event in the monitoring data. The fingerprint uniquely identifies the event associated with the load. Responsive to determining that the event associated with the load indicates that the load is switched on, the method includes determining a load set point temperature associated with the load. The load set point temperature is representative of a maximum temperature of the hot water to be delivered to the load. The load set point temperature is set by an end user. The method also includes controlling, based on a feedback from the temperature sensor, the mixing valve to adjust the maximum temperature of the hot water that is delivered from the water heater to the load from a water heater set point temperature at which the hot water is maintained in the water heater to the load set point temperature.

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
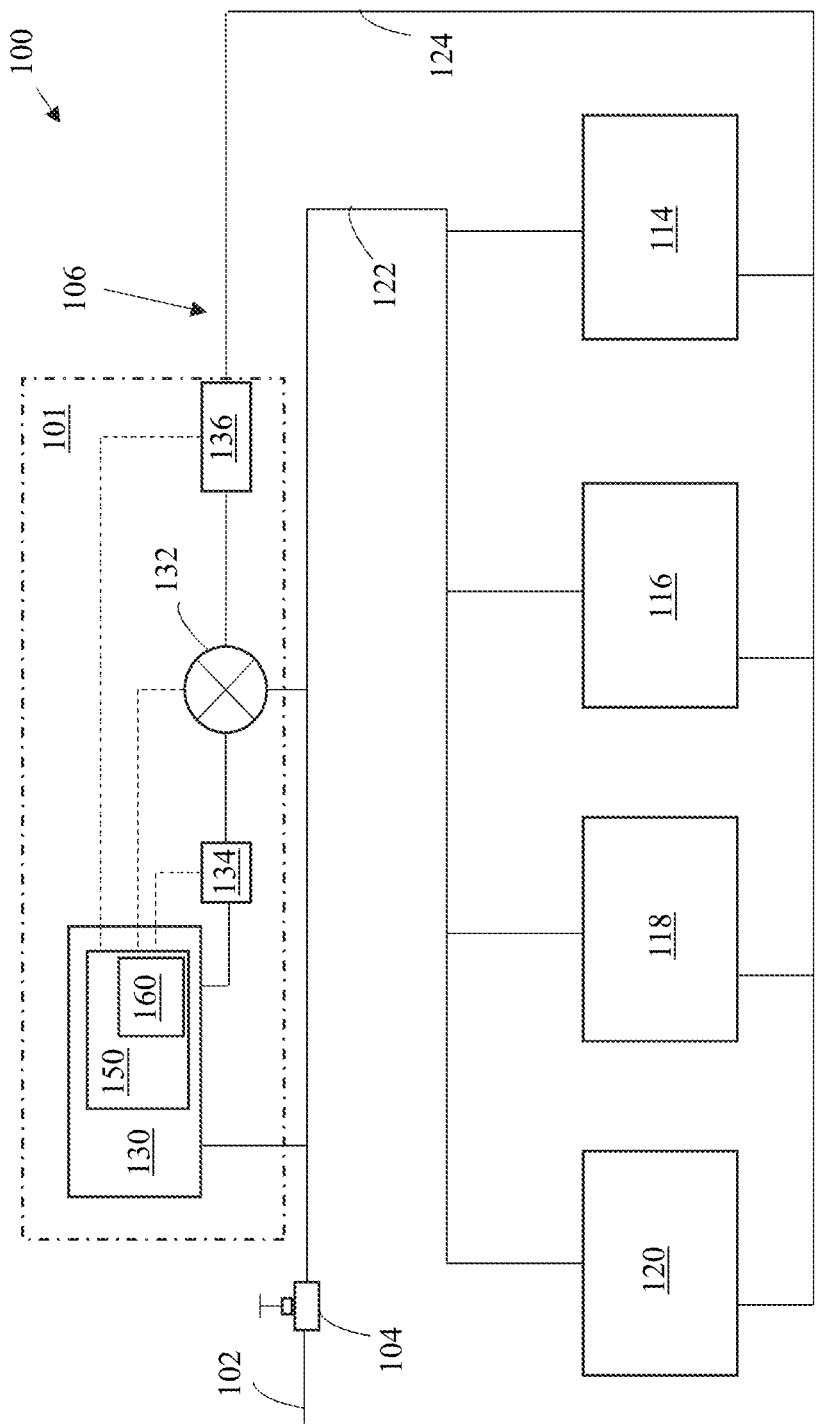
FIG. 1 illustrates an example hot water delivery system, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed on clearly illustrating the principles of the example embodiments. Additionally, certain dimensions or positions may be exaggerated to help visually convey such principles.

DETAILED DESCRIPTION

In the following paragraphs, a hot water delivery system will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

The hot water delivery system of the present disclosure allows the maximum temperature of the hot water that is delivered to different loads to be independently controlled such that different loads that are all coupled to the same water heater may receive hot water at different temperatures. Further, the hot water delivery system allows an end user to set the maximum temperature at which hot water is to be delivered to each load. The ability to provide each load with hot water at a maximum temperature of a user's choice which may be different from the water heater set point temperature results in energy savings and/or a performance upgrade.

Before discussing the example embodiments directed to the hot water delivery system, it may assist the reader to understand the various terms used herein by way of a general description of the terms in the following paragraphs. The term 'cold water' as used herein may generally refer to water that is not heated using a water heater before delivery to a load. For example, the cold water may include the potable water that is supplied from an external water-supply utility system (e.g., public utility systems, groundwater, etc.) to the water supply system of a residential or commercial use building and is distributed to the different loads of the residential or commercial building via a cold water distribution line without being heated by the water heater. In one example, cold water may refer to water at ambient temperature or water at a temperature that a human user perceives as being cold or cool. Alternatively, cold water may refer to water having a temperature that is lower than the temperature of the hot water that is being delivered to the loads. Similarly, the term 'hot water' as used herein may generally refer to the water that has been heated using a water heater. In one example, hot water may refer to water that is at a temperature that a human user perceives as being hot.

The term 'load' as used herein may generally refer to any appropriate device, appliance, or fixture that may be used to dispense and/or control the dispensation of water (i.e., hot water and/or cold water). The load may be disposed at end points or locations in a residential or commercial use building where water needs to be dispensed. Each load may include a cold water dispensing control valve and a hot water dispensing control valve. Opening or switching on the cold water dispensing control valve may create a demand for cold water which may be supplied to the load via the cold water distribution line. Similarly, opening or switching on the hot water dispensing control valve may create a demand for hot water which may be supplied to the load from the water heater via the hot water distribution line. The loads may include, but are not limited to, faucets, shower heads, dishwashers, etc.

An example hot water delivery system of the present disclosure includes a water heater and a plurality of loads that are coupled to the water heater. The loads may be coupled to the water heater via a common hot water distribution line through which hot water may be delivered to one or more of the loads responsive to a demand for the hot water at said one or more of the loads. The water heater may be configured to maintain the hot water therein at a water heater set point temperature. Further, the example hot water delivery system includes a load identification sensor configured to identify events associated with a load that is coupled to the water heater in association with a demand for hot water, such as, a switching on or switching off of a hot water control valve of the load, for example. In one example, the load identification sensor may be disposed in the hot water distribution line or a cold water distribution line. In another example, the load identification sensor may be coupled to a power line that supplies power to the load to identify electrical variations such as electrical pulse variations or electrical noise associated with the event of the load. In other words, the load identification sensor may be configured to identify an event associated with the load based on water pressure variation patterns, electrical noise patterns, or other appropriate patterns or characteristics that are uniquely associated with said event of the load.

Furthermore, the hot water delivery system may include a mixing valve that is disposed at an outlet of the water heater to mix the hot water from the water heater with the cold water from the cold water distribution line to adjust a maximum temperature of the hot water prior to delivering the hot water to a load where there is demand for the hot water. Additionally, the hot water delivery system may include a temperature control engine that is disposed at the output of the mixing valve and configured to provide temperature data which is used as feedback to control the mixing valve to adjust a temperature of the hot water that is delivered to a load.

In the example hot water delivery system, initially, the temperature control engine may be configured to determine and store fingerprints (e.g., unique patterns) associated with each event of each load that is coupled to the water heater. The fingerprints may be used to identify a specific event associated with the load, such as, switching on or switching off of the load. Further, the temperature control engine may store a load set point temperature associated with each load. The load set point temperature associated with each load may be input by the user and may be changed as desired by the user. The load set point temperature associated with a load may be representative of the maximum temperature of the hot water that is to be delivered to the load.

Once the fingerprints and the load set point temperature associated with each load are determined, set, and stored, the load identification sensor is configured to monitor the hot water delivery system to detect an event associated with at least one load. Monitoring the hot water delivery system may include monitoring the water distribution lines, the power lines, etc. The data collected from monitoring ("monitored data") is transmitted to a controller of the water heater that comprises a temperature control engine. The temperature control engine may be configured to detect the occurrence of an event and control the mixing valve to provide hot water to a load at a temperature that is set by a user. The temperature control engine may parse the monitored data to detect the occurrence of an event associated with at least one load.

Responsive to detecting the occurrence of an event associated with a load, the temperature control engine may determine the type of the event associated with the load and a load set point temperature associated with the load. Further, based on the event associated with the load, the temperature control engine and the load set point temperature associated with the load, the temperature control engine may be configured to generate and transmit control signals to the mixing valve to mix the hot water from the water heater that is at the water heater set point temperature with cold water from the cold water distribution line to adjust the temperature of the hot water to the load set point temperature of the load prior to delivering the hot water to the load. If another load is switched on or switched off while the hot water is being delivered to the load, the temperature control engine may be configured to adjust the temperature of the hot water based on the load set point temperatures of both the loads, and/or a set of exception handling rules. The exception handling rules may be factory set and/or set by a user in the field.

Example embodiments of the hot water delivery system will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the hot water delivery system of the present disclosure may be embodied in many different forms and should not be construed as limited to the embodiments set forth herein; rather, these embodiments are provided so that this disclosure will be thorough and complete, and will fully convey the scope of the technology to those appropriately skilled in the art. Further, example embodiments of the hot water delivery system of the present disclosure can be disposed and/or operate in water supply systems located in any type of environment (e.g., commercial use building, residential building, etc.) for any type (e.g., commercial, residential, industrial) of user. Further, the example hot water delivery system of the present disclosure is configured to work with all common types of hot water heaters (e.g., tankless, tank, electric, gas, hybrid, solar, etc.), thereby making the example hot water delivery system of the present disclosure universally and backwards compatible with all residential and/or commercial applications.

Turning now to the figures, example embodiments of an instant hot water delivery system will be described in association with FIGS. 1-6. In particular, example hot water delivery systems of the present disclosure will be described in connection with FIGS. 1-2; and example methods of hot water delivery systems will be described in connection with FIGS. 3-6 by referring to FIGS. 1-2 as needed.

Figure 2:
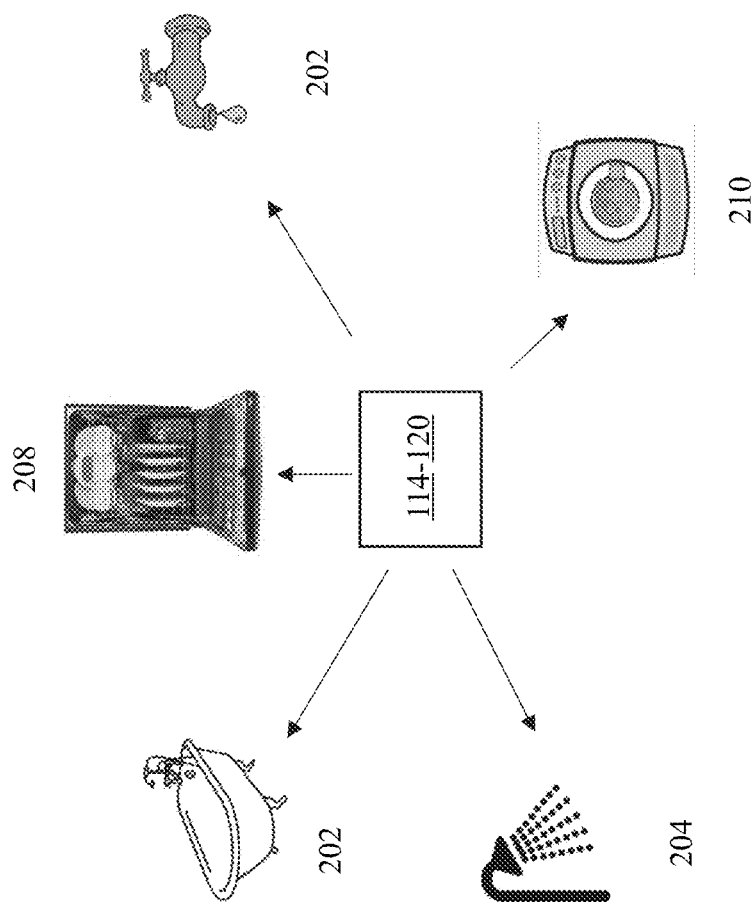
FIG. 2 illustrates example loads that are coupled to a water heater of the hot water delivery system of FIG. 1, in accordance with example embodiments of the present disclosure.

Referring to FIGS. 1-2, a utility system line 102 may be configured to deliver potable water from a water-supply utility system to a pressurized water system 101 (hereinafter interchangeably referred to as a 'water supply system') at high pressure using a system of high-pressure pumps. The utility system line 102 may be coupled to a pressure regulator 104 that is disposed at an interface between the utility system line 102 and a water distribution line assembly 106 of the pressurized water system 101. The pressure regulator 104 may be configured to regulate or reduce a pressure of the water that is supplied from the water-supply utility system to a pressure level that is suitable for pressurized water system 101, such as to ensure safety and longevity of the water distribution line assembly 106 and/or the different loads (114-120) served by the water distribution line assembly 106 in the pressurized water system 101. The pressurized water system 101 may be part of a home or any other appropriate venue, such as a commercial building. It is noted that the pressurized water system 101 illustrated in FIG. 1 is merely exemplary and is not limited to the embodiments presented herein. Further, the pressurized water system 101 may be employed in many different embodiments or examples not specifically depicted or described herein.

The water distribution line assembly 106 may include a cold water distribution line 122 and a hot water distribution line 124 that are coupled to the different loads (114-120) of the pressurized water system 101. The different loads (114-120) may include, but are not limited to, a faucet 202, a shower 204, a dishwasher 208, a washing machine 210, as illustrated in FIG. 2. The cold water distribution line 122 may be configured to deliver cold water from the water-supply utility system to the different loads (114-120) responsive to a demand for the cold water. Similarly, the hot water distribution line 124 may be configured to deliver hot water from a water heater 130 to the different loads (114-120) responsive to a demand for the hot water. In addition to being coupled to the different loads (114-120), the cold water distribution line 122 may also be coupled to an input of the water heater 130. The water heater 130 may be configured to heat the cold water input from the cold water distribution line and maintain the hot water at a water heater set point temperature that may be factory set or set by a user. An output of the water heater 130 may be coupled to the hot water distribution line 124 that is configured to deliver the hot water from the water heater 130 to the different loads (114-120) responsive to a demand for hot water.

In addition to the water distribution line assembly 106 and the water heater 130, the hot water delivery system 100 may include a load identification sensor 134 that is installed in the pressurized water system 101. As illustrated in FIG. 1, the load identification sensor 134 may be installed in the hot water distribution line 124 at the output of the water heater 130. However, in other example embodiments, the load identification sensor 134 at any other appropriate location in the hot water distribution line 124. Alternatively, the load identification sensor 134 may be disposed in the cold water distribution line 122 without departing from a broader scope of the present disclosure. The load identification sensor 134 that is installed in the water distribution line 122 or 124 may include, but is not limited to, a pressure sensor and/or a flow sensor. In the example embodiment illustrated in FIG. 1, the load identification sensor 134 may be configured to detect unique water pressure characteristics or patterns and/or flow characteristics or patterns that are associated with different events of the different loads (114-120) such as, but not limited to, switching on and switching off the different loads (114-120) in association with a demand for hot water (e.g., switching on of hot water control valve at load). For example, each time a load such as a faucet is switched on, a water pressure in the cold water distribution line 122 and/or the hot water distribution line 124 changes and a vibration is created which results in pressure waves that travel through the water distribution lines (122, 124). The pressure waves may have a profile that is unique for each event of a load. That is, the frequency, amplitude, etc., associated with the pressure waves generated responsive to switching on the hot water valve of a faucet may be unique and distinguishable from the pressure waves that are generated when the faucet is switched off or pressure waves generated in association with another event of another load.

Even though the present disclosure describes the load identification sensor 134 as being installed in the water distribution lines (122, 124) and being configured to detect water pressure or flow patterns associated with the different events of the different loads (114-120), in other example embodiments, other load identification sensors that can detect any other appropriate unique characteristics associated with the different events of the different loads may be used without departing from a broader scope of the present disclosure. For example, the hot water delivery system 100 may include a load identification sensor 134 that may be installed in a power supply line that is coupled to and configured to power an electrical power driven load (116, 118), such as a dishwasher or washing machine. In said example, the load identification sensor 134 may be configured to detect unique electrical power variation patterns or electrical noise patterns associated with the different events of the different loads. That is, in said example, the event of switching on a dishwasher may generate an electrical noise pattern that is unique to the event of switching on the dishwasher and the load identification sensor 134 may be configured to detect said unique electrical noise pattern.

In yet another example embodiment, the hot water delivery system 100 may include more than one load identification sensor 134, each of which are configured to detect different types of unique characteristics or patterns. For example, the hot water delivery system 101 may include one load identification sensor 134 that is installed in the water distribution lines (122, 124) and another load identification sensor 134 that is installed in a power supply line that is coupled to an electrical power driven load. The load identification sensor(s) 134 may be battery powered, electrically coupled to the water heater 130 to receive operational power therefrom, and/or coupled to an existing electrical power outlet.

In certain example embodiments, the load identification sensor(s) 134 may include other sensors such as temperature sensors that may used in addition to or instead of the pressure, flow, and/or electrical sensors. In said example embodiments, the temperature sensors may be disposed at each load (114-120). In addition to the temperature sensors, flow sensors may also be placed at each load (114-120). In said example embodiments, if there is a temperature change measured at a load that indicates flow from the hot water heater 130, said temperature change characteristic can be used instead of the pressure waves, flow patterns, and/or electrical noise patterns.

Figure 4:
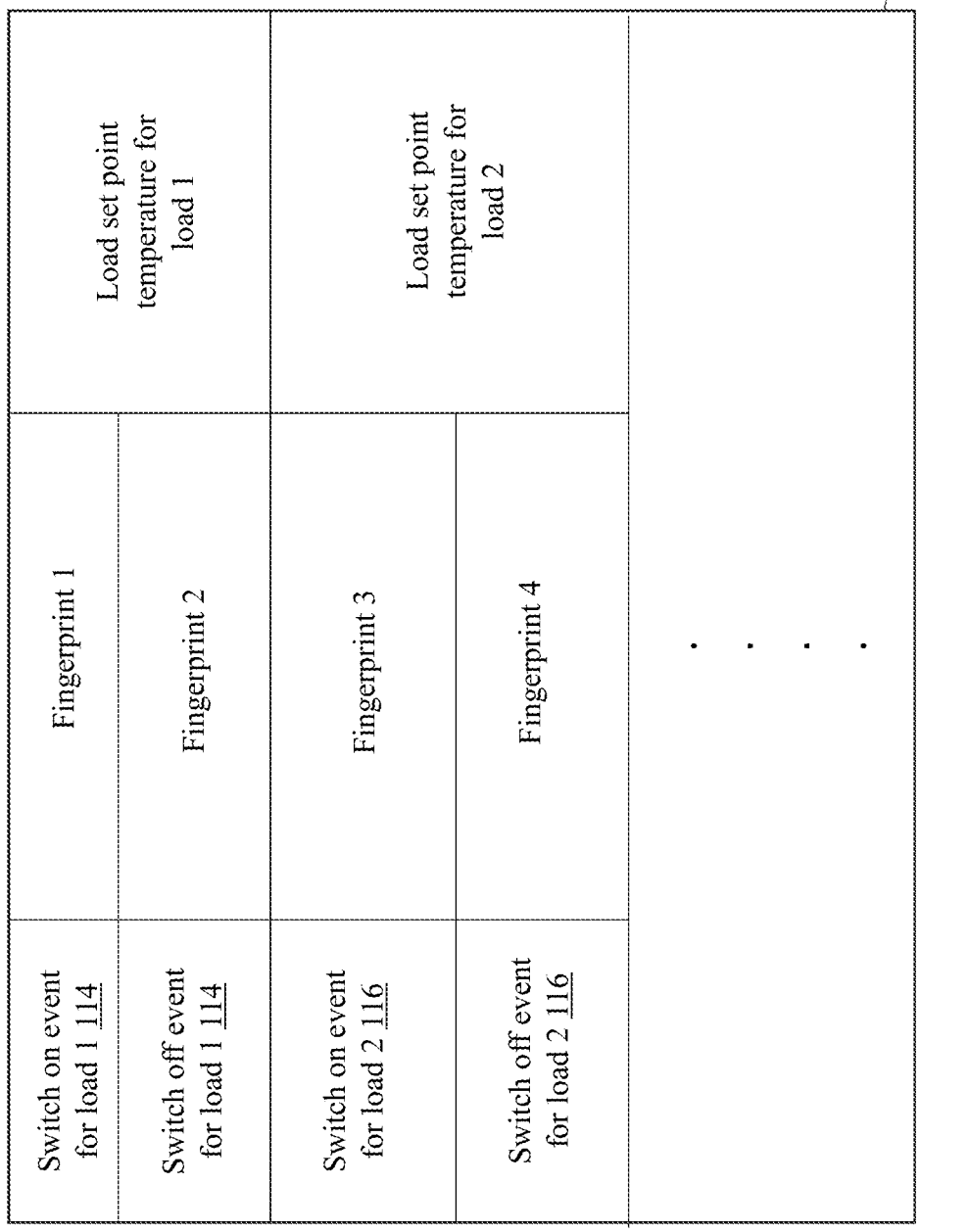
FIG. 4 illustrates an example fingerprint data table that stores the fingerprints and/or load set point temperature for each load, where the fingerprints uniquely identify different events associated with the respective load, in accordance with example embodiments of the present disclosure.

In addition to detecting the unique characteristics or patterns (e.g., pressure, flow, electrical noise, etc.) associated with the different events of the different loads (114-120), the load identification sensor(s) 134 may be configured to operate in concert with a controller 150 of the water heater 130 to generate fingerprints of the different loads (114-120) and the events associated therewith using the detected unique characteristics or patterns. In particular, the controller 150 may include a temperature control engine 160 that is installed or embedded therein and configured to process the data received from the load identification sensor(s) 134 to generate the fingerprints. Responsive to detecting the unique characteristics or patterns associated with an event of a load, the load identification sensor(s) 134 may be configured to convert the detected unique characteristic or patterns into electrical signals and transmit said electrical signals to the temperature control engine 160 of the controller 150 to generate fingerprints. In some example embodiments, the load identification sensor 134 may be communicably coupled to the controller 150 via a wireless link. Accordingly, the data regarding the detected unique characteristic or patterns may be wirelessly transmitted from the load identification sensor(s) 134 to the controller 150 of the water heater 130. In either case, the fingerprints may be used to uniquely identify the different loads (114-120) and the different events associated therewith. As illustrated in FIG. 4, the fingerprints associated with different events of different loads (114-120) may be stored in a fingerprint data table 402. In one example embodiment, a fingerprint associated with an event of a load (114-120) may be generated based on only one type of unique characteristic or pattern (e.g., electrical noise patterns, water pressure patterns, or flow patterns, etc.) associated with the event of the load. However, in other example embodiments, the fingerprint may be generated by combining more than one type of unique characteristics or patterns (e.g., at least two of the electrical noise patterns, water pressure patterns, flow patterns, etc.) associated with the event of the load.

The hot water delivery system 100 may further include a mixing valve 132 and a water temperature sensor 136 that are communicably coupled to the controller 150 of the water heater 130. The mixing valve 132 and the water temperature sensor 136 may be configured to operate in concert with the temperature control engine 160 of the controller 150 to adjust a temperature of the hot water from the water heater 130 prior to delivering the hot water to the different loads (114-120). The mixing valve 132 may be a three port valve comprising two input ports and an output port. The two input ports of the mixing valve 132 may be coupled to the output of the water heater 130 and the cold water distribution line 122, respectively, and the output port may be coupled to the hot water distribution line 124. The mixing valve 132 may be configured to receive control signals from the controller 150 to mix the hot water from the water heater 130 with the cold water from the cold water distribution line 122 to adjust the temperature of the hot water prior to delivering the hot water to the one or more of the different loads (114-120). The control signals may be generated based on the temperature of the hot water at the output of the mixing valve 132 that is measured using the water temperature sensor 136. The water temperature sensor 136 may be coupled to the hot water distribution line 124 at the output of the mixing valve 132 and configured to measure a temperature of the hot water at the output of the mixing valve 132. The measured temperature of the hot water at the output of the mixing valve 132 may be provided as feedback to the temperature control engine 160 of the controller 150 of the water heater 130 to generate control signals for the mixing valve 132.

Figure 3:
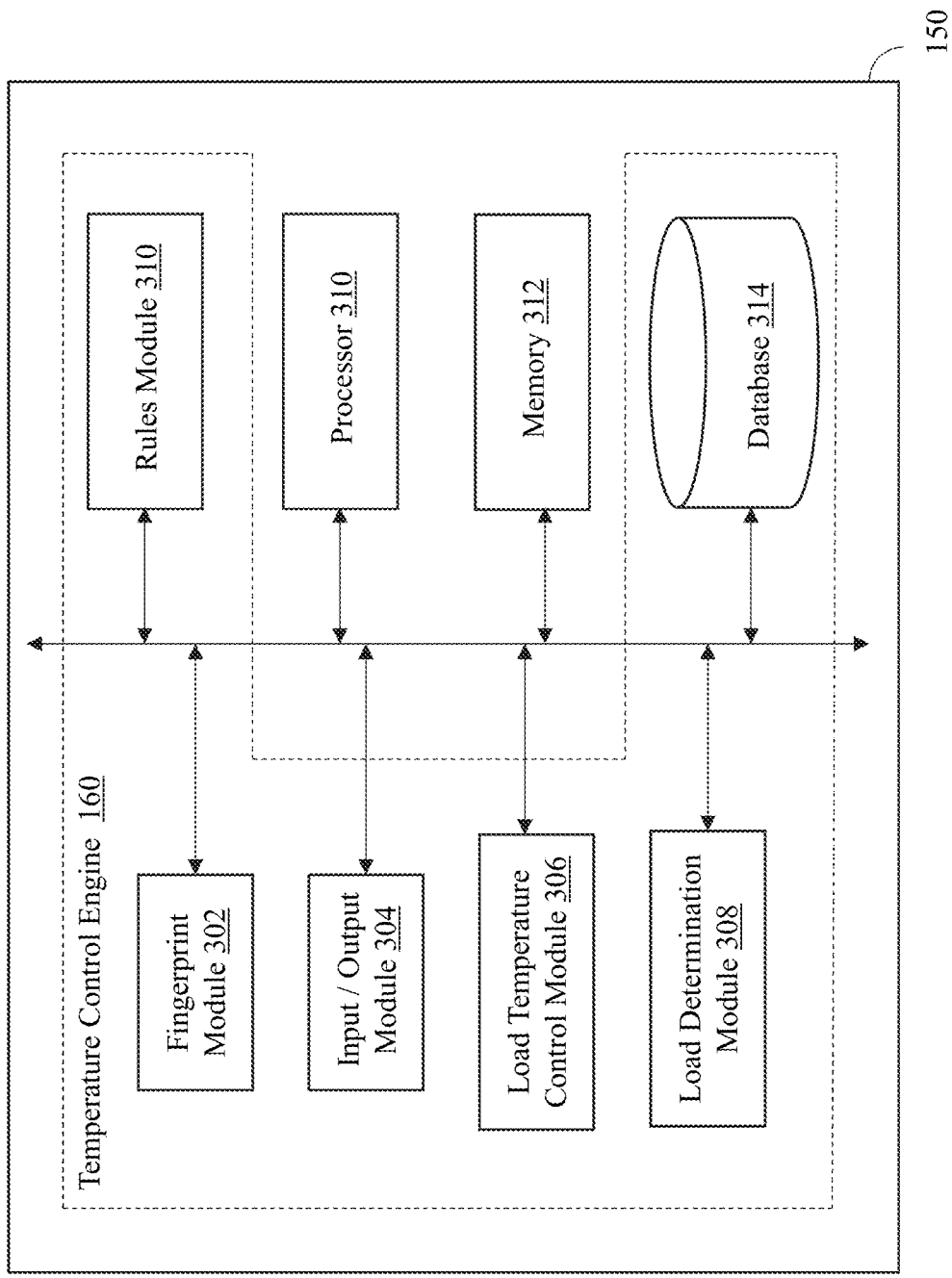
FIG. 3 illustrates a schematic diagram of a controller of the water heater of FIG. 1 and a temperature control engine of the water heater, in accordance with example embodiments of the present disclosure.

The different components of the temperature control engine 160 of the controller 150 and the operations associated with the temperature control engine 160 to adjust the temperature of the hot water that is delivered to a load based on a maximum temperature of hot water that is to be delivered to the load as set by a user (hereinafter 'load set point temperature') may be described below in greater detail in association with FIGS. 3 and 5-6 by referring to FIGS. 1-2 and 4 as needed. Although specific operations are disclosed in the flowcharts illustrated in FIGS. 5 and 6, such operations are only non-limiting examples. That is, embodiments of the present invention are well suited to performing various other operations or variations of the operations recited in the flowchart. It is appreciated that the operations in the flowcharts illustrated in FIGS. 5 and 6 may be performed in an order different than presented, and that not all the operations in the flowchart may be performed.

Figure 5:
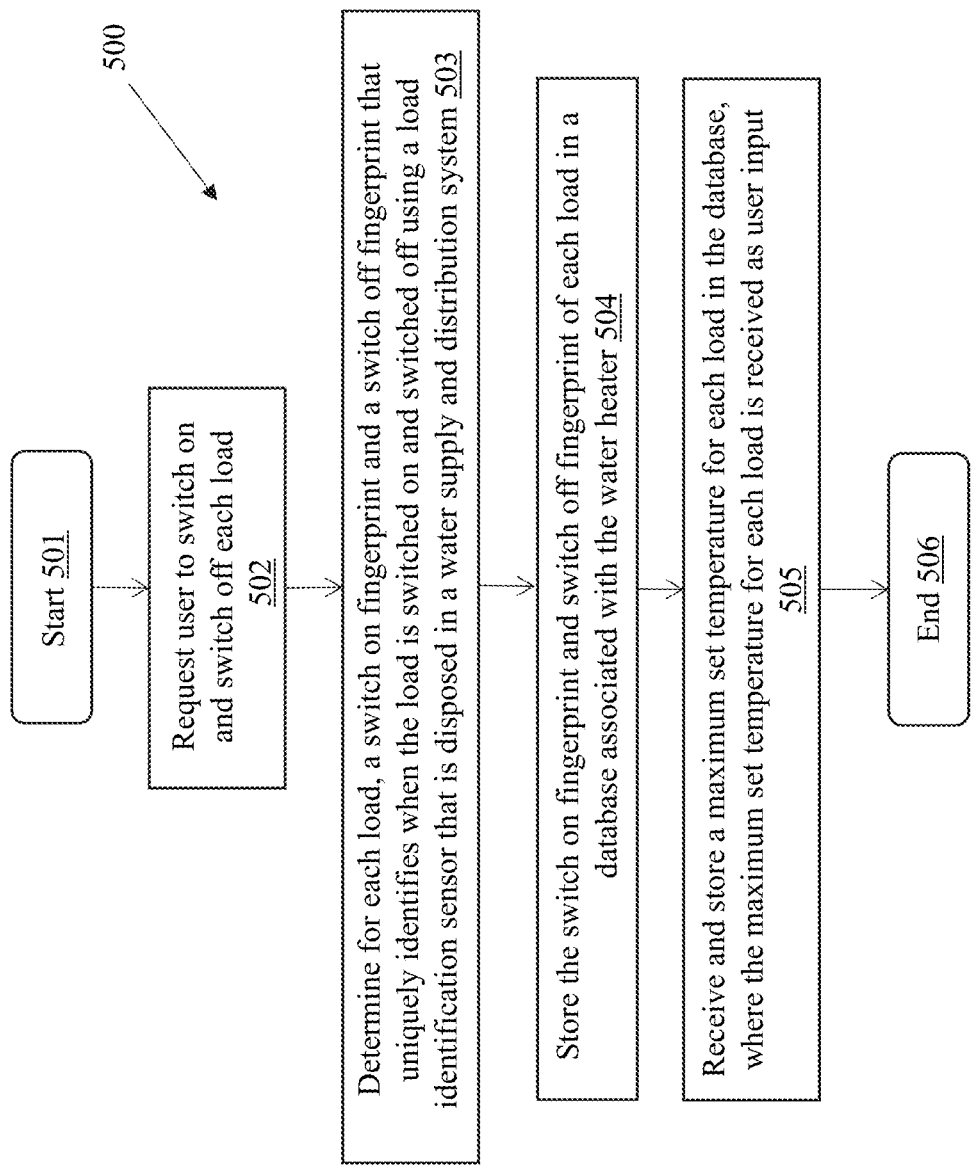
FIG. 5 is a flowchart that illustrates an example method of the temperature control engine, in accordance with example embodiments of the present disclosure.
Figure 6A:
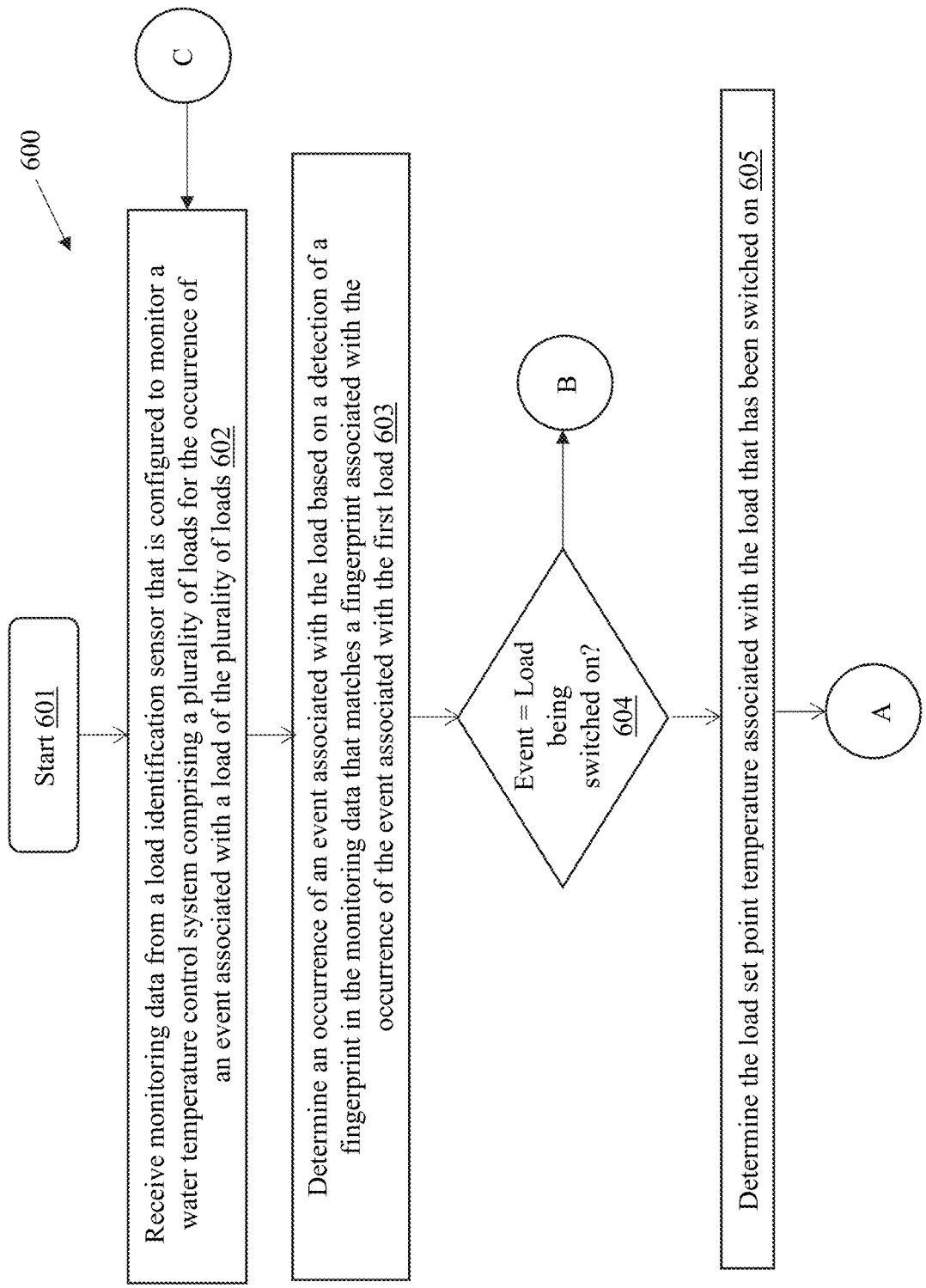
FIGS. 6A-6C (collectively 'FIG. 6') are flowcharts that illustrate another example method of the temperature control engine, in accordance with example embodiments of the present disclosure.
Figure 6B:
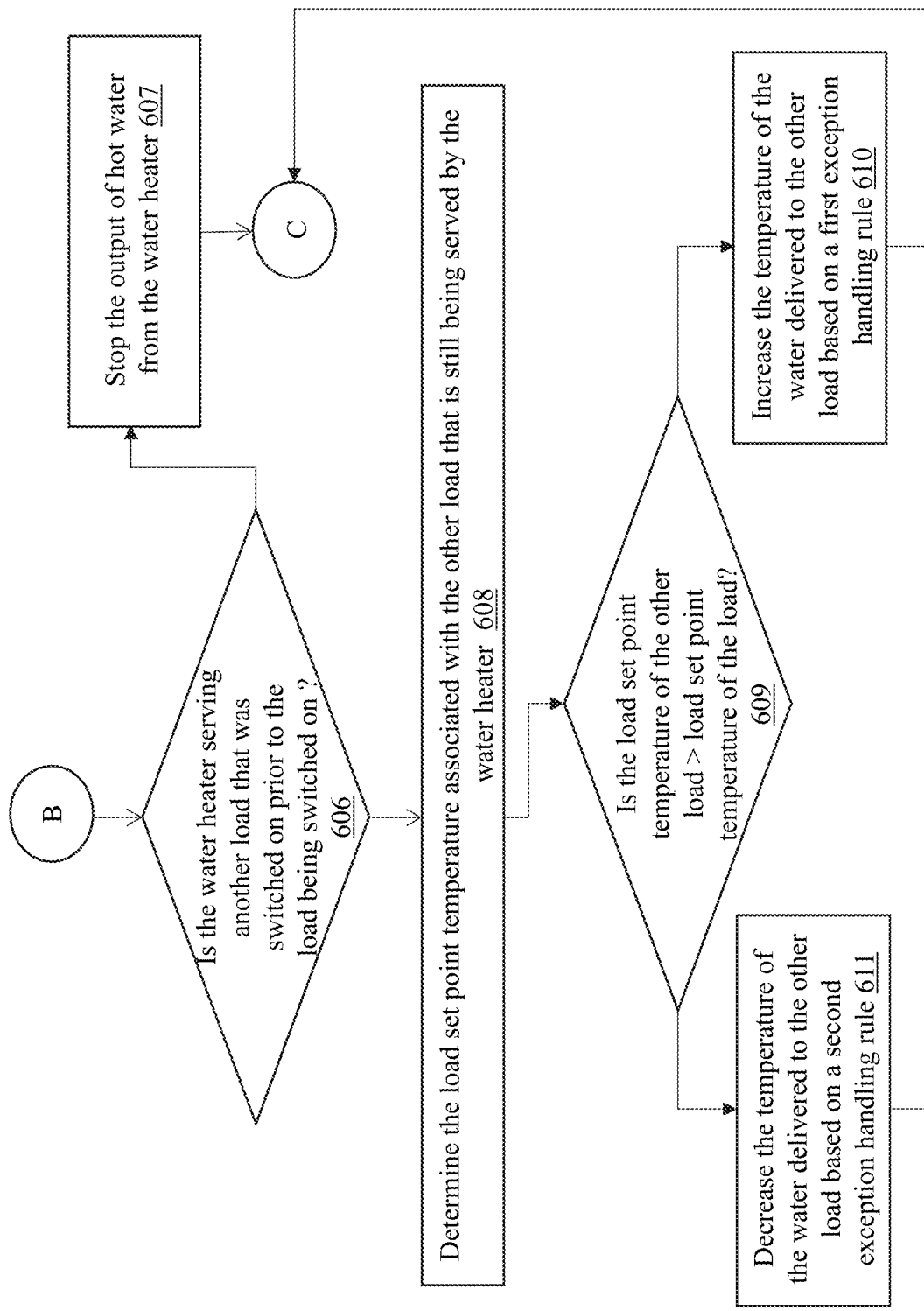
Figure 6C:
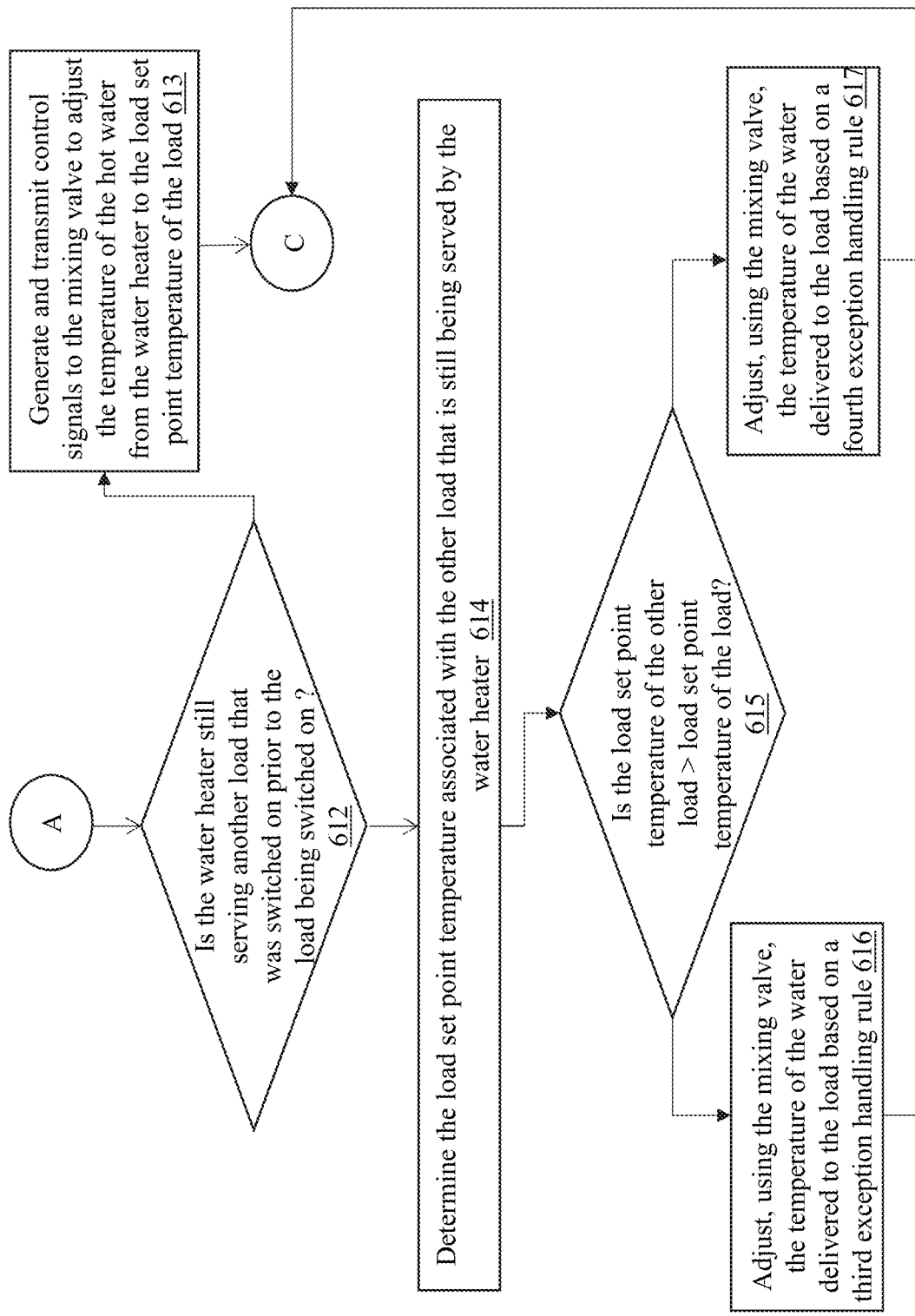

All, or a portion of, the embodiments described by the flowchart illustrated in FIGS. 5 and 6 can be implemented using computer-readable and computer-executable instructions which reside, for example, in a memory of the controller 150 or a computer-usable media of a computer system. As described above, certain processes and operations of the present invention are realized, in one embodiment, as a series of instructions (e.g., software programs) that reside within computer readable memory of a computer system and are executed by the processor of the controller 150. When executed, the instructions cause the controller to implement the functionality of the present invention as described below.

Referring to FIG. 5, this figure illustrates an example process 500 of the temperature control engine 160 in association with an initial set up phase. In particular, the process 500 is associated with determining and storing fingerprints for each event of each load (114-120) and the load set point temperature for each load (114-120) of the hot water delivery system 100. The process 500 may be executed during a setup phase of the hot water delivery system 100. In other words, the process 500 may be completed prior to initiating a regular operation of the hot water delivery system 100 where the mixing valve 136 is controlled to provide each individual load with hot water having a maximum temperature that is set by an end user.

The process 500 begins at operation 501 and proceeds to operation 502 where the fingerprint module 302 (shown in FIG. 3) of the temperature control engine 160 generates and transmits a request to a user to switch on and switch off each load (114-120) in the pressurized water system 101. In one example embodiment, the request may be presented to the user via an in-built display, audio device, or other similar in-built user communication interface of the controller 150 or the water heater 130. Alternatively, in other example embodiments, the temperature control engine 160 may be configured to transmit the request to a computing device associated with the user via a wireless communication module (not shown) of the controller 150. In either case, responsive to being prompted to switch on and switch off the loads (114-120), in operation 502, the user may switch on or switch off the loads (114-120) based directions or prompts received from the temperature control engine 160 of the controller 150. For example, in addition to prompting the user to switch on and switch off the loads (114-120), the fingerprint module 302 of the temperature control engine 160 may generate and display or transmit messages that direct a user to switch on or switch off a first load 114 followed by a second load 116 and so on.

Responsive to each event associated with each load (114-120), i.e., switching on and switching off each load (114-120), in operation 503, the input/output module 304 of the temperature control engine 160 may receive, via the wireless communication module (not shown) of the controller 150, electrical signals or data representative of the unique characteristics or patterns detected by the load identification sensor 134 in association with the respective event of the load. That is, responsive to each event associated with each load (114-120), the load identification sensor 134 may detect a unique characteristic or pattern associated with the event of each load (114-120). Upon detecting the unique characteristic or pattern associated with an event of a load (114-120), the load identification sensor 134 may transmit data or electrical signals representative of the unique characteristic or pattern associated with the event of the load (114-120) to the controller 150. Further, in operation 503, the input/output module 304 of the temperature control engine 160 of the controller 150 may transmit the received data or electrical signals to the fingerprint module 302 to generate fingerprints associated with each event of each load (114-120) based on the unique characteristic or pattern associated with the respective event of each load (114-120).

In operation 504, the fingerprint module 302 may store the fingerprints associated with the different events of each load (114-120) within a database 314 of the temperature control engine 160. As illustrated in FIG. 4, the fingerprints associated with the different events of the different loads (114-120) may be recorded in a fingerprint data table 400 within the database 314. For example, a first fingerprint may be associated with switching on a first load 114, a second fingerprint may be associated with switching off the first load 114, a third fingerprint may be associated with switching on the second load 116, and so on. As described above, each fingerprint may uniquely identity an event associated with a load.

Responsive to generating and storing the fingerprints associated with each event of each load (114-120), in operation 505, the input/output module 304 of the temperature control engine 160 may receive the load set point temperatures for each load (114-120) of the pressurized water system 101. In particular, in operation 505, the fingerprint module 302 of the temperature control engine 160 may generate and transmit a request prompting a user to input the load set point temperature for each load (114-120) of the pressurized water system 101. In other words, the hot water delivery system of the present disclosure allows the end user to set the lot set point temperature of the hot water that is to be delivered to each load in the system which is distinguishable from conventional water systems that have no flexibility in that all the loads get hot water at the same temperature which is typically the water heater set point temperature. As described above, the load set point temperature of a load may be representative of a maximum temperature of the hot water that should be delivered to the load, where the maximum temperature may be equal to or different from (e.g., lower than) the water heater set point temperature at which the water heater maintains the hot water therein.

In some example embodiments, the load set point temperature associated with each load may be a range of temperatures instead of a single value. For example, the load set point temperature of a load (e.g., load 116) may be 120° F.-125° F. In either case, responsive to receiving the user inputted load set point temperature for each load of the pressurized water system 101, in operation 505, the fingerprint module 302 of the temperature control engine 160 may store the load set point temperatures in the database 314 of the temperature control engine 160. For example, the load set point temperatures may be stored in the fingerprint data table 400 as illustrated in FIG. 4. Responsive to storing the fingerprints and the load set point temperatures of the different loads (114-120), the process 500 ends in operation 506.

Even though the present disclosure describes that the process 500 of determining and storing the fingerprints and/or the load set point temperatures of each load is performed during a set up phase (e.g., prior to the regular operation phase), one of skill in the art can understand and appreciate that in some example embodiments, the process 500 may be executed during the regular operation of the hot water delivery system 100 without departing from a broader scope of the present disclosure. For example, if a new load is added to the pressurized water system 101, the process 500 may be executed to determine the fingerprints and/or the load set point temperature of the new load. In other words, whenever a load in the pressurized water system 101 is removed (or no longer used) or a new load is added, the temperature control engine 160 of the controller 150 may be configured to update the fingerprint data table 400 to reflect the changes in the pressurized water system 101. An example regular operation phase of the hot water delivery system 100 will be described below in greater detail in association with FIG. 6.

Turning to FIG. 6, this figure illustrates another example method 600 of the temperature control engine 160 in association with a regular operation phase of the hot water delivery system 100. Referring to FIG. 6, the process 600 begins at operation 601 and proceeds to operation 602 where the input/output module 304 of the temperature control engine 102 receives monitoring data from the load identification sensor 134. The load identification sensors 134 may be configured to monitor (either continuously or at regular intervals) the water distribution lines (122, 124) and/or the power lines (not shown), for example, to detect an occurrence of an event associated with at least one load of the plurality of loads (114-120). In the example embodiment illustrated in FIG. 6, the load identification sensor(s) 134 may be configured to transmit the data collected during monitoring (e.g., the monitoring data) to the temperature control engine 160 of the controller 150.

Responsive to receiving the monitoring data, in operation 603, the input/output module 304 of the temperature control engine 160 may operate in concert with the load determination module 308 to parse the monitoring data to determine if the monitoring data comprises a fingerprint that matches at least one of the stored fingerprints in the database 314 (e.g., the fingerprint data table 400) of the temperature control engine 160. Upon determining that the monitoring data comprises a fingerprint that matches at least one of the stored fingerprints in the database 314, in operation 603, the load determination engine 308 may determine the event of the load that has the stored fingerprint in the database 314 that matches the fingerprint in the received monitoring data. For continuity and ease of explanation, in the following description, it is assumed that the load having a fingerprint in the database 314 that matches the fingerprint in the received monitoring data is load 114. However, one of skill in the art can understand and appreciate that the load 114 is chosen as an example and in other example embodiments the load having the fingerprint that matches the fingerprint in the received monitoring data may include any of the other loads (116-120) without departing from a broader scope of the present disclosure.

Once the event of the load 114 having the stored fingerprint in the database 314 that matches the fingerprint in the received monitoring data is identified, in operation 604, the load determination module 308 may be configured to determine if the event associated with the load 114 indicates that the load 114 has been switched on or switched off. Responsive to a positive determination that the event indicates that the load 114 has been switched on, the process 600 proceeds to operation 605. However, responsive to a negative determination that the event indicates that the load 114 has been switched on, the process 600 proceeds to operation 606. That is, upon determining that the event associated with the load 114 indicates that the load has been switched off, the process 600 proceeds to operation 606.

In operation 605, the load determination module 308 may operate in concert with the load temperature control module 306 to query the database 314 to obtain a first load set point temperature associated with the load 114. Responsive to determining the first load set point temperature associated with the load 114, in operation 612, the load temperature control module 306 of the temperature control engine 160 may determine if the water heater is currently serving another load (e.g., load 118) that was switched on prior to the load 114. The controller 150 may record events associated with all the loads that are coupled to the water heater in a memory 312 thereof, for example. Upon determining that the water heater 130 is serving another load 118 that was switched on prior to the load 114 (i.e., the other load 118 has not yet been switched off), in operation 614, the load temperature control module 306 may be configured to determine the second load set point temperature associated with the other load 118. Then, in operation 615, the load temperature control module 306 may determine whether the second load set point temperature of the other load 118 is greater than the first load set point temperature of the load 114. If the second load set point temperature of the other load 118 is greater than the first load set point temperature of the load 114, then, in operation 616, the load temperature control module 306 may be configured to operate in concert with the rules module 310 to generate and transmit control signals to the mixing valve 132 to adjust a temperature of the hot water from the water heater 130 based on a third exception handling rule.

In one example, the third exception handling rule may include instruction to reduce the temperature of the hot water to both the loads (114, 118) to a lower one of the second load set point temperature of the other load 118 and the first load set point temperature of the load 114. In other words, the third exception handling rule may instruct the controller 150 to reduce the temperature of the hot water from the water heater 130 from the second load set point temperature of the other load 118 to the first load set point temperature of the load 114. In said example, the third exception handling rule may also include instructions to generate an alert that informs a user associated with the other load 118 that the temperature of the hot water will be reduced to the lower first load set point temperature of the load 114 that has been switched on. The temperature of the hot water may be gradually reduced from the second load set point temperature of the other load 118 to the first lower load set point temperature of the load 114. However, in another example, the third exception handling rule may include instructions to: (a) generate an alert that informs a user associated with the load 114 that hot water is currently being delivered to another load at a higher second load set point temperature, and (b) continue delivering hot water at the higher second load set point temperature of the other load 118 upon receiving an approval from the user associated with the load 114. In yet another example, the third exception handling rule may include instructions to: (a) generate an alert that informs a user associated with the load 114 and the other load 118 that hot water will be delivered to both loads at a temperature that is an average of the first and second load set point temperatures of both the loads (114 118), and (b) adjust the temperature of the hot water from the water heater 130 to the temperature that is the average of the first and second load set point temperatures of both the loads (114 118) upon receiving an approval from one or both the users associated with the loads (114, 118). In some other examples where the load set point temperature is a range of temperatures, the third exception handling rule may instruct the controller 150 to adjust the temperature of the hot water to either a temperature at the lower end of the second load set point temperature range of the other load 118 or a temperature at the high end of the first load set point temperature range of the load 114.

If the second load set point temperature of the other load 118 is lower than the first load set point temperature of the load 114, then, in operation 617, the load temperature control module 306 may be configured to operate in concert with the rules module 310 to generate and transmit control signals to the mixing valve 132 to adjust a temperature of the hot water from the water heater 130 based on a fourth exception handling rule. Similar to the third exception handling rule, in one example, the fourth exception handling rule may include instructions to: (a) generate an alert informing the user associated with the load 114 that the water heater is currently serving the other load 118 having the second load set point temperature that is lower than the first load set point temperature of the load 114, and (b) continue delivering the hot water at the lower second set point temperature associated with the other load 118, adjust the temperature of the hot water to an average of the first and second load set point temperature of the loads (114, 118), or adjust the temperature of the hot water to a temperature at a higher or lower end of the first and second load set point temperature ranges of the loads (114, 118) (provided the load set point temperatures are provided as ranges). Responsive to making the adjustments to the temperature of the hot water that is delivered to the load 114 that has been switched on, the process proceeds back to operation 602 from operations 616 and 617, where the temperature control engine 160 continues to parse the monitoring data received from the load identification sensor(s) 134 to determine the occurrence of another event associated with at least one of the loads (114-120).

However, if the load temperature control module 306 determines that the water heater 130 is not serving another load 118, i.e., if the load 114 is the only load that is being served, then, in operation 613, the load temperature control module 306 may be configured to generate and transmit control signals to the mixing valve 132 to adjust a temperature of the hot water from the water heater 130 to the first load set point temperature of the load 114. Responsively, the process 600 proceeds back to operation 602 where the temperature control engine 160 continues to parse the received monitoring data to determine the occurrence of another event associated with at least one of the loads (114-120).

Referring back to operation 604, responsive to determining that the event associated with the load 114 indicates that the load 114 has been switched off, the process 600 proceeds to operation 606. That is, the load 114 may have been switched on previously and in operation 604, load temperature control module 306 may determine that the load 114 has been switched off now. Similar to operation 612, responsive to determining that the load 114 has been switched off, in operation 606, the load temperature control module 306 of the temperature control engine 160 may determine if the water heater is currently serving another load (e.g., load 118) that was switched on prior to the load 114. Upon determining that the water heater 130 is not serving another load 118, i.e., there is no load that is currently switched on or demanding hot water from the water heater, in operation 607, the load temperature control module 306 may be configured to stop any output of hot water from the water heater 130 and revert the water heater 130 to a maintenance mode where the water heater 130 continues to maintain the hot water therein at the water heater set point temperature.

However, upon determining that the water heater 130 is serving another load 118 that was switched on prior to the load 114, in operations 608 and 609, the load temperature control module 306 may determine the second load set point temperature of the other load 118 and compare the second load set point temperature of the other load 118 with the first load set point temperature of the load 114. Responsive to determining that the second load set point temperature of the other load 118 is higher than the first load set point temperature of the load 114, the process 600 proceeds to operation 611 where the temperature of the hot water that is delivered to the other load 118 may be increased to the second load set point temperature of the other load 118 based on a first exception handling rule. In one example, the first exception handling rule may include instructions to gradually increase the temperature of the hot water that is delivered to the other load 118 to the second higher load set point temperature of the other load 118. In another example, the first exception handling rule may include instructions to gradually increase the temperature of the hot water that is delivered to the other load 118 responsive to generating and transmitting an alert that informs a user associated with the other load 118 that the temperature of the hot water will be raised and/or receiving an approval from the user.

If the second load set point temperature of the other load 118 is lower than the first load set point temperature of the load 114, the process 600 proceeds to operation 610 where the temperature of the hot water that is delivered to the other load 118 may be adjusted to the second load set point temperature of the other load 118 based on a second exception handling rule. In one example, prior to the event of the load 114 being switched off, if the hot water was being delivered at the lower second load set point temperature of the other load 118, the second exception handling rule may include instructions to maintain the temperature of the hot water without any changes. Alternatively, in another example, prior to the event of the load 114 being switched off, if the hot water was being delivered at an average temperature of the load set point temperatures of the loads (114, 118) or at any other temperature that is between the load set point temperatures of the loads (114, 118), the second exception handling rule may include instructions to gradually lower the temperature of the hot water being delivered to the other load 118 to the second load set point temperature of the other load 118. The temperature of the hot water may be lowered responsive to generating an alert informing a user associated with the other load 118 that the temperature of the hot water that is delivered to the other load 118 is being lowered.

Responsive to making the adjustments to the temperature of the hot water that is delivered to the other load 114, the process 600 proceeds back to operation 602 from operations 610 and 611, where the temperature control engine 160 continues to parse the monitoring data received from the load identification sensor(s) 134 to determine the occurrence of another event associated with at least one of the loads (114-120).

In one or more example embodiments, the different exception handling rules may be stored in the database 314 of the temperature control engine. In one example embodiment the different exception handling rules may be set by the manufacturer and may or may not be overwritten or changed. Alternatively, in other example embodiments, the different exception handling rules may be set by the user during the initial set up phase and may be overwritten or changed. Further, the first, second, third, and fourth exception handling rules as described herein are examples and are not limiting. That is, in other example embodiments, there may be more or fewer exception handling rules; and the instructions provided by the first, second, third, and fourth exception handling rules may be different from the ones described above without departing from a broader scope of the present disclosure.

In one example embodiment, if two or more loads are switched on at the same time, i.e., if the water heater 130 is serving two or more loads at the same time, typically, the exception handling rules may be set to cause the temperature of the hot water to be adjusted to the lowest of the load set point temperatures of the two or more loads to prevent injuries from the hot water (e.g., scalding). However, in other example embodiments, the exception handling rules may be set to provide hot water at a higher temperature of the load set point temperatures of the two or more loads or at an average of the load set point temperatures of the two or more loads. In said other examples, the exception handling rules may be executed only after alerting the users of an increase in the maximum temperature of the hot water and/or responsive to receiving a consent from the user. That is, in general, the exception handling rules may always be set to minimize or prevent any hot water related injuries to the end users from the change in temperatures of the hot water that is delivered to the loads.

It is noted that the controller 150, the temperature control engine 160, and/or the different modules 302-310 of the temperature control engine 160 may be implemented as a hardware, such as circuits, processors, etc., software, and/or as a combination of hardware and software without departing from a broader scope of the present disclosure. In one example embodiment, the processor 312 of the temperature control engine 160 may be a multi-core processor or a combination of multiple single core processors. Further, the temperature control engine 160 may include a memory 316 coupled to the processor 312. The memory 316 may be non-transitory storage medium, in one embodiment, and a transitory storage medium in another embodiment. The memory 316 may include instructions that may be executed by the processor 312 to perform operations of the temperature control engine 160. In other words, in said example embodiment, the operations associated with the different modules 302-310 of the temperature control engine 160 may be executed using the processor 310.

Further, even though the present disclosure describes the database 314 as being part of the temperature control engine 160, one of skill in the art can understand and appreciate that in other example embodiments, the database 314 may be external to and communicably coupled to the temperature control engine 160 and/or the controller 150 without departing from a broader scope of the present disclosure.

In one example of the hot water delivery system of the present disclosure, the water heater set point temperature of a water heater may be set to 140° F. Further, in said example, each load of the hot water delivery system may be registered with the controller of the water heater. The registration may be completed by manually entering data associated with the loads. Alternatively, the controller may be configured to automatically discover the loads, for example, when each load has an identifier. The loads may include a dishwasher and a shower in a child's bathroom. Responsive to registering the loads, the controller may interact with the user to initiate different events associated with the loads, such as switching on and switching off the loads. Then, the controller operates in concert with the load identification sensor(s) to determine fingerprints that uniquely identify each event associated with each load of the hot water delivery system. Further, the controller may interact with the user to receive load set point temperatures of each load. In said example, the load set point temperature of the shower in the child's bathroom (child's shower) may be set at 120° F. and the load set point temperature of the dishwasher may be set at 130° F.

Once the loads are registered and the fingerprints of each event of the loads are stored along with the load set point temperature for each load, the load identification sensor may monitor the loads of the hot water delivery system to determine the occurrence of an event associated with the loads. Monitoring the loads may include monitoring the water distribution lines and/or electric power lines that supply power to the loads such as the dishwasher. Upon determining that the hot water tap of the child's shower has been switched on, the temperature control engine of the controller may control the mixing valve to reduce the temperature of hot water from the water heater from 130° F. (water heater set point temperature) to 120° F. (load set point temperature) prior to being delivered to the child's shower. If the dishwasher is switched on at the same time, the controller may be configured to control the mixing valve based on exception handling rules. In said example, the exception handling rules may include instructions to continue providing the hot water at 120° F. and not raising it to the load set point temperature of the dishwasher, i.e., 130° F. to prevent a user taking a shower in the child's shower from being scalded by a sudden increase in maximum temperature of the hot water that is delivered thereto. That is, the dishwasher may receive hot water at 120° F. till the child's shower is switched off. When, the child's shower is switched off, the maximum temperature of the hot water that is delivered to the dishwasher may be raised to 130° F.

In some other examples, when both the child's shower and the dishwasher are switched on at the same time (i.e., when both loads are demanding hot water at the same time), the maximum temperature of the hot water that is delivered to both the child's shower and the dishwasher may be adjusted to an average of the load set point temperatures of the child's shower and the dishwasher, i.e., at 125° F. The average temperature, i.e., 125° F. may be higher than the load set point temperature for the child's shower. So, the exception handling rules may include instructions to provide alerts and/or receive an approval before the temperature of the hot water delivered to the child's shower is increased.

Although the present embodiments have been described with reference to specific example embodiments, it will be evident that various modifications and changes may be made to these embodiments without departing from the broader spirit and scope of the various embodiments. For example, the various devices, engines, and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A hot water delivery system comprising:
   a load identification sensor installed in one of a hot water distribution pipe or a cold water distribution pipe of a water supply system, the hot water distribution pipe being configured to deliver hot water to a first load, and the cold water distribution pipe being configured to deliver cold water to the first load;
   a mixing valve comprising a first inlet that is coupled to an outlet of a water heater, a second inlet that is coupled to the cold water distribution pipe, and a valve outlet that is coupled to the hot water distribution pipe;
   a temperature sensor that is coupled to the hot water distribution pipe at the valve outlet of the mixing valve; and
   a controller associated with the water heater and configured to:
      determine, based on data received from the load identification sensor, that hot water is being directed to the first load;
      determine a first load set point temperature associated with the first load, wherein the first load set point temperature is representative of a maximum temperature of the hot water that is to be delivered to the first load;
      cause, based on first feedback from the temperature sensor, the mixing valve to adjust a maximum temperature of the hot water that is delivered from the water heater to the first load from a water heater set point temperature at which the hot water is maintained in the water heater to the first load set point temperature;
      determine, while hot water is being directed to the first load, that a second load is switched on and hot water is to be directed to the second load at a second load set point temperature;
      determine that the first load set point is different than the second load set point; and
      cause, based on second feedback from the temperature sensor, the determination that the second load is switched on, and the determination that the first load set point is different than the second load set point, the mixing valve to modify the maximum temperature of the hot water that is delivered from the water heater to a value between the first load set point temperature and the second load set point temperature.

2. The hot water delivery system of claim 1, wherein the water heater set point temperature is greater than or equal to the first load set point temperature.

3. The hot water delivery system of claim 1, wherein the controller is configured to:
   determine fingerprints associated with a hot water use event of the first load, the hot water use event comprising one of a switching on operation and a switching off operation of the first load;
   store the fingerprints associated with each hot water use event of the first load; and
   receive and store the first load set point temperature associated with the first load.

4. The hot water delivery system of claim 3, wherein the controller is further configured to:
   determine that the first load is switched on based on the fingerprints associated with the hot water use event of the first load.

5. The hot water delivery system of claim 3, wherein the fingerprints comprise one of a unique pressure variation pattern, a unique pressure wave pattern, a unique electric noise pattern, and a unique electrical pulse pattern that is associated with each hot water use event of the first load.

6. The hot water delivery system of claim 1, wherein the controller is further configured to:
   determine, using the load identification sensor, that the first load is switched off; and
   responsive to determining that the first load is switched off, stop the control of the mixing valve.

7. The hot water delivery system of claim 1, wherein the load identification sensor comprises a water pressure sensor that is configured to measure a pressure of water in the water supply system.

8. The hot water delivery system of claim 1, wherein the load identification sensor comprises an ultrasound sensor.

9. The hot water delivery system of claim 1, wherein the load identification sensor is an electrical power line sensor.

10. The hot water delivery system of claim 4, wherein the fingerprints comprise a combination of unique pressure variations patterns and unique electrical noise pattern associated with each hot water use event of the first load.

11. The hot water delivery system of claim 1, wherein the controller is configured to:
    determine that the second load is coupled thereto via the hot water distribution pipe,
    wherein the second load set point temperature is representative of a maximum temperature of the hot water that is to be delivered to the second load, the second load set point temperature being different from the water heater set point temperature at which the hot water is maintained at the water heater;
    determine the second load set point temperature;
    determine that the second load set point temperature is different from the first load set point temperature; and
    cause the mixing valve to adjust the maximum temperature of the hot water that is being delivered from the water heater to the first load and the second load based on an exception handling rule.

12. The hot water delivery system of claim 11, wherein the exception handling rule comprises instructions to adjust the maximum temperature of the hot water that is being delivered from the water heater to the first load and the second load to a lesser of the first load set point temperature and the second load set point temperature.

13. A method of a controller of a water heater disposed in a hot water delivery system that includes a load identification sensor, a mixing valve coupled to an output of the water heater, a temperature sensor disposed at an output of the mixing valve, and a first load that is coupled to the output of the mixing valve, the method comprising:
    receiving monitoring data from the load identification sensor that is configured to detect an event associated with the first load, the event being associated with a demand for hot water;
    determining an occurrence of the event associated with the first load based on identifying a fingerprint associated with the event in the monitoring data, wherein the fingerprint uniquely identifies the event associated with the first load;
    determining a first load set point temperature associated with the first load, wherein the first load set point temperature is representative of a maximum temperature of the hot water to be delivered to the first load, wherein the first load set point temperature is set by an end user; and
    controlling, based on first feedback from the temperature sensor, the mixing valve to adjust a maximum temperature of the hot water that is delivered from the water heater to the first load from a water heater set point temperature at which the hot water is maintained in the water heater to the first load set point temperature;
    determining that a second load is switched on while hot water is being directed to the first load, wherein the hot water is directed to the second load at a second load set point temperature;
    determining that the first load set point is different than the second load set point; and
    controlling, based on second feedback from the temperature sensor, the determination that the second load is switched on, and the determination that the first load set point is different than the second load set point, the mixing valve to modify the maximum temperature of the hot water that is delivered from the water heater to a value between the first load set point temperature and the second load set point temperature.

14. The method of claim 13, further comprising:
    receiving, from the load identification sensor, data comprising a unique pattern that is associated with the event;
    generating the fingerprint based on the unique pattern; and
    storing the fingerprint in a database where the fingerprint is associated with the event of the first load.

15. The method of claim 14, wherein the unique pattern comprises one of a unique pressure variation pattern, a unique pressure wave pattern, a unique electric noise pattern, and a unique electrical pulse pattern that is associated with the event of the first load.

16. The method of claim 14, wherein the load identification sensor comprises a water pressure sensor that is configured to measure a pressure of water in at least one of a hot water distribution pipe and a cold water distribution pipe of the hot water delivery system, wherein the cold water distribution pipe is coupled to the first load and an inlet of the water heater, and wherein the hot water distribution pipe is coupled to the first load and the output of the mixing valve.

17. The method of claim 13, wherein the load identification sensor comprises an ultrasound sensor.

18. The method of claim 13, wherein the load identification sensor is an electrical power line sensor.

19. The method of claim 13:
wherein the hot water delivery system comprises another load that is coupled to the output of the mixing valve, and
wherein when the controller determines that both the first load and another load are switched on, the method of the controller comprises:
adjusting the maximum temperature of the hot water that is being delivered from the water heater to the first load and the other load to a lesser of the first load set point temperature of the first load and a load set point temperature of the another load.

20. The method of claim 13,
wherein the hot water delivery system comprises another load that is coupled to the output of the mixing valve, and
wherein when the controller determines that both the first load and the another load are switched on, the method of the controller comprises:
adjusting the maximum temperature of the hot water that is being delivered from the water heater to the first load and the other load to an average value of the first load set point temperature of the first load and a load set point temperature of the another load.

21. A hot water delivery system comprising:
a load identification sensor installed in one of a hot water distribution pipe and a cold water distribution pipe of a water supply system, the hot water distribution pipe being configured to deliver hot water to a load and the cold water distribution pipe being configured to deliver cold water to the load;
a mixing valve comprising a first inlet that is coupled to an outlet of a water heater, a second inlet that is coupled to the cold water distribution pipe, and a valve outlet that is coupled to the hot water distribution pipe;
a temperature sensor that is coupled to the hot water distribution pipe at the valve outlet of the mixing valve; and
a controller associated with the water heater and configured to:
determine, based on monitoring data received from the load identification sensor, that the load is switched on in association with a demand for the hot water;
responsive to determining that the load is switched on, determine a first load set point temperature associated with the load,
wherein the first load set point temperature is representative of a maximum temperature of the hot water that is to be delivered to the load, the first load set point temperature being set by an end user;
determine whether the water heater is providing hot water to another load that is coupled thereto via the hot water distribution pipe, the another load having been switched on prior to the load and having a second load set point temperature associated therewith,
wherein the second load set point temperature is representative of a maximum temperature of the hot water that is to be delivered to the another load, the second load set point temperature being different from the first load set point temperature at which the hot water is maintained at the water heater;
responsive to determining that the another load is switched on, determine the second load set point temperature associated with the another load;
determine whether the second load set point temperature is different from the first load set point temperature;
provide a notification to a user device of a user associated with the load or the another load that the second load set point temperature is different from the first load set point temperature;
receive an approval from the user device to modify the maximum temperature of the hot water that is being delivered from the water heater to the load and the another load to a value between the first load set point temperature and the second load set point temperature; and
responsive to determining the second load set point temperature is different from the first load set point temperature and receiving the approval, control, based on feedback from the temperature sensor, the mixing valve to modify the maximum temperature of the hot water that is being delivered from the water heater to the load and the another load to the value.

* * * * *